United States Patent
Oda et al.

(10) Patent No.: US 9,879,886 B2
(45) Date of Patent: Jan. 30, 2018

(54) TURBO REFRIGERATOR

(71) Applicant: DAIKIN INDUSTRIES, LTD., Osaka-shi, Osaka (JP)

(72) Inventors: Kentarou Oda, Tokyo (JP); Nobuyoshi Sakuma, Tokyo (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 76 days.

(21) Appl. No.: 14/895,605

(22) PCT Filed: Jun. 2, 2014

(86) PCT No.: PCT/JP2014/064607
§ 371 (c)(1),
(2) Date: Dec. 3, 2015

(87) PCT Pub. No.: WO2014/196497
PCT Pub. Date: Dec. 11, 2014

(65) Prior Publication Data
US 2016/0138835 A1 May 19, 2016

(30) Foreign Application Priority Data
Jun. 4, 2013 (JP) .................................. 2013-117737

(51) Int. Cl.
*F25B 1/053* (2006.01)
*F25B 43/00* (2006.01)
(Continued)

(52) U.S. Cl.
CPC ............. *F25B 1/053* (2013.01); *F25B 43/006* (2013.01); *F25B 1/10* (2013.01); *F25B 25/005* (2013.01);
(Continued)

(58) Field of Classification Search
CPC .......... F25B 1/053; F25B 45/006; F25B 1/10; F25B 25/005; F25B 31/004; F25B 31/008;
(Continued)

(56) References Cited

U.S. PATENT DOCUMENTS 4,594,858 A * 6/1986 Shaw ....................... F25B 1/10
62/175
2007/0147984 A1 6/2007 Takahashi et al.
(Continued)

FOREIGN PATENT DOCUMENTS

| CN | 103062077 A | 4/2013 |
|---|---|---|
| EP | 2068099 A2 | 6/2009 |
| JP | 9-79192 A | 3/1997 |
| JP | 2002-327700 A | 11/2002 |
| JP | 2007-177695 A | 7/2007 |

(Continued)

OTHER PUBLICATIONS

Extended European Search Report, dated Feb. 27, 2017, for European Application No. 14807005.5.
(Continued)

*Primary Examiner* — Mohammad M Ali
(74) *Attorney, Agent, or Firm* — Birch, Stewart, Kolasch & Birch, LLP

(57) ABSTRACT

A turbo refrigerator (1) includes: a turbo compressor (5) to which a gas-phase component (X3) of a refrigerant from an economizer (3) is supplied, wherein the turbo compressor (5) includes a first flow path (R10) through which a compressed refrigerant gas (X1) flows, and a connecting pipe (5b) connected to the first flow path (R10) and a second flow path (R3) through which the gas-phase component (X3) of the refrigerant flows, and the diameter of the connecting pipe (5b) reduces toward the first flow path (R10) from the second flow path (R3).

7 Claims, 2 Drawing Sheets

(51) Int. Cl.
*F25B 1/10* (2006.01)
*F25B 25/00* (2006.01)
*F25B 31/00* (2006.01)
*F25B 31/02* (2006.01)

(52) U.S. Cl.
CPC ........... *F25B 31/004* (2013.01); *F25B 31/008* (2013.01); *F25B 31/026* (2013.01); *F25B 2339/047* (2013.01); *F25B 2341/0653* (2013.01); *F25B 2341/0662* (2013.01); *F25B 2400/13* (2013.01); *F25B 2400/23* (2013.01); *F25B 2500/01* (2013.01); *Y02B 30/72* (2013.01)

(58) Field of Classification Search
CPC ........ F25B 2339/047; F25B 2341/0653; F25B 2400/13; F25B 2400/23; F25B 2500/01; F25B 31/026; F25B 2341/0662; F25B 43/006; Y02B 30/72; F04D 29/58; F04D 17/12
USPC .................................................... 62/512, 509
See application file for complete search history.

(56) References Cited

U.S. PATENT DOCUMENTS

| 2007/0147985 | A1 | 6/2007 | Takahashi et al. |
| 2009/0193845 | A1* | 8/2009 | Sugitani ................ F04D 17/122 62/510 |
| 2011/0219809 | A1* | 9/2011 | Kurihara ............... F01D 15/005 62/468 |

FOREIGN PATENT DOCUMENTS

| JP | 2007-212112 A | 8/2007 |
| JP | 2007-255748 A | 10/2007 |
| JP | 2009-138996 A | 6/2009 |
| JP | 2009-186033 A | 8/2009 |
| JP | 2011-257036 A | 12/2011 |
| JP | 2013-76389 A | 4/2013 |

OTHER PUBLICATIONS

International Search Report, issued in PCT/JP2014/064607, dated Sep. 2, 2014.

* cited by examiner ized component of the refrigerant which is supplied to the evaporator.

TURBO REFRIGERATOR

TECHNICAL FIELD

The present invention relates to a turbo refrigerator.

Priority is claimed on Japanese Patent Application No. 2013-117737, filed on Jun. 4, 2013, the content of which is incorporated herein by reference.

BACKGROUND ART

In the past, in a turbo refrigerator, heat transport has been performed by circulating a refrigerant between a condenser and an evaporator, condensing the refrigerant compressed in a turbo compressor, in the condenser, and evaporating the condensed refrigerant in the evaporator.

In order to efficiently vaporize the refrigerant in the evaporator, it is desirable that there is less of a gas-phase component which is contained in the refrigerant which is supplied to the evaporator. For this reason, as shown in, for example, Patent Document 1, an economizer is installed ahead of an evaporator, and thus a gas-phase component of a refrigerant which is supplied to the economizer is removed, and the removed gas-phase component of the refrigerant is returned to a turbo compressor.

Patent Document 2 and Patent Document 3 disclose the detailed configuration of a site where in Patent Document 1, the removed gas-phase component of the refrigerant is returned from the economizer to the turbo compressor.

CITATION LIST

Patent Document

[Patent Document 1] Japanese Unexamined Patent Application, First Publication No. 2009-186033
[Patent Document 2] Japanese Unexamined Patent Application, First Publication No. 2013-76389
[Patent Document 3] Japanese Unexamined Patent Application, First Publication No. 2007-177695

SUMMARY OF INVENTION

Technical Problem

However, a suggestion for how to supply the gas-phase component of the refrigerant separated out in the economizer to the turbo compressor has not been made. For example, in Patent Document 1, a pipe for supplying the gas-phase component of the refrigerant separated out in the economizer to the turbo compressor has a uniform diameter up to the turbo compressor and is connected to the turbo compressor at a right angle. In such a turbo refrigerator, in a case where the pipe is thick, a flow velocity in the pipe becomes slower, and thus an acceleration loss is generated when joining the main stream which flows through the turbo compressor. Further, in a case where the pipe is thin, a pressure loss in the pipe increases, and thus the pressure in the economizer is not sufficiently lowered (the pressure does not drop), and therefore, the evaporation of the refrigerant is not sufficiently performed in the economizer.

The present invention has been made in view of the above-described circumstances and has an object to favorably perform gas-liquid separation in an economizer and reduce an acceleration loss when supplying a gas-phase component of a refrigerant to a turbo compressor, in a turbo refrigerator which is provided with the economizer.

Solution to Problem

According to a first aspect of the present invention, there is provided a turbo refrigerator including: a turbo compressor to which a gas-phase component of a refrigerant from an economizer is supplied, wherein the turbo compressor includes a first flow path through which a compressed refrigerant gas flows, and a connecting pipe connected to the first flow path and a second flow path through which the gas-phase component of the refrigerant flows, and a diameter of the connecting pipe reduces toward the first flow path from the second flow path.

According to a second aspect of the present invention, in the first aspect, a pressure loss in the entirety of the second flow path and the connecting pipe is a value at which the gas-phase component of the refrigerant can flow from the economizer into the second flow path.

According to a third aspect of the present invention, in the first aspect, a pipe configuring the second flow path has a uniform diameter.

According to a fourth aspect of the present invention, in the first aspect, the gas-phase component of the refrigerant which flows through the second flow path flows in parallel to the compressed refrigerant gas which flows through the first flow path when joining the compressed refrigerant gas.

According to a fifth aspect of the present invention, in the first aspect, the first flow path is configured with an elbow pipe.

According to a sixth aspect of the present invention, in the fifth aspect, an angle of an outlet with respect to an inlet of the elbow pipe is 180°.

According to a seventh aspect of the present invention, in the fifth aspect, the gas-phase component of the refrigerant which flows through the second flow path is spirally supplied to the elbow pipe.

According to an eighth aspect of the present invention, in the fifth aspect, the turbo refrigerator further includes: a third flow path through which the gas-phase component of the refrigerant from an economizer different from the economizer flows; and another connecting pipe which is provided separately from the connecting pipe and connected to the elbow pipe.

According to a ninth aspect of the present invention, there is provided a turbo refrigerator including: a turbo compressor to which a gas-phase component of a refrigerant from an economizer is supplied, wherein the turbo compressor includes a connecting pipe connected to a first flow path through which a compressed refrigerant gas flows and a second flow path through which the gas-phase component of the refrigerant flows, and a diameter of the connecting pipe on the first flow path side is smaller than a diameter of the connecting pipe on the second flow path side.

Advantageous Effects of Invention

According to the present invention, a return flow portion has a throttle portion. For this reason, it is possible to widen a flow path area at an entrance portion of the return flow portion on the economizer side and increase the velocity of the gas-phase component of the refrigerant which is discharged from the return flow portion. Therefore, according to the present invention, it is possible to favorably perform gas-liquid separation in the economizer by suppressing an increase in pressure loss in the return flow portion and to reduce an acceleration loss when joining the main stream in the turbo compressor.

DESCRIPTION OF EMBODIMENTS

Hereinafter, an embodiment of a turbo refrigerator according to the present invention will be described with reference to the drawings. In addition, in the following drawings, in order to show each member in a recognizable size, the scale of each member is appropriately changed.

Figure 1:
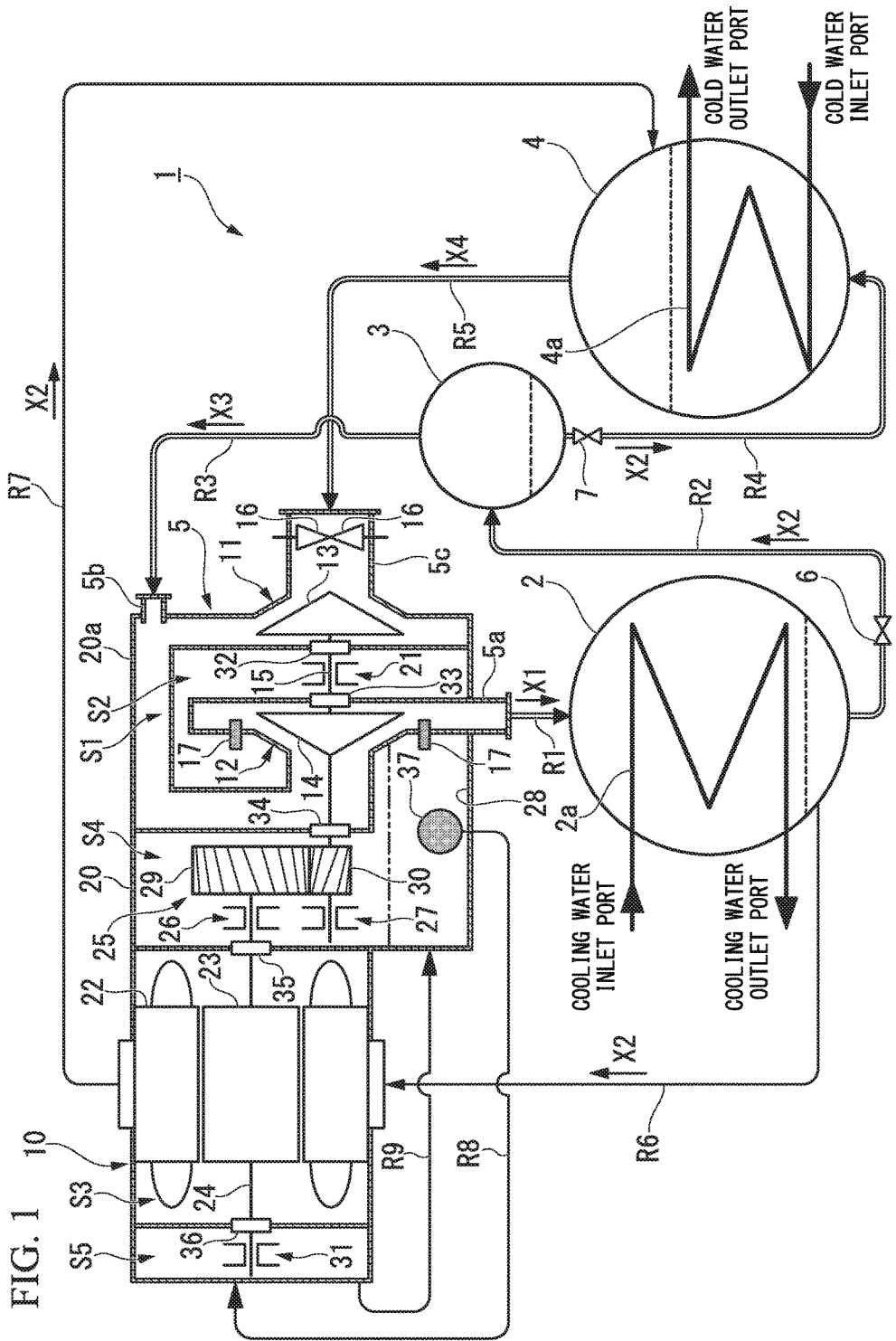
FIG. 1 is a system diagram of a turbo refrigerator in an embodiment of the present invention.

FIG. 1 is a system diagram of a turbo refrigerator 1 in an embodiment of the present invention. The turbo refrigerator 1 is provided with a condenser 2, an economizer 3, an evaporator 4, a turbo compressor 5, an expansion valve 6, and an expansion valve 7, as shown in FIG. 1.

The condenser 2 is connected to a gas discharge pipe 5a of the turbo compressor 5 through a flow path R1. A refrigerant (a compressed refrigerant gas X1) compressed by the turbo compressor 5 is supplied to the condenser 2 through the flow path R1. The condenser 2 liquefies the compressed refrigerant gas X1. The condenser 2 is provided with a heat exchanger tube 2a through which cooling water flows, and cools and liquefies the compressed refrigerant gas X1 by heat exchange between the compressed refrigerant gas X1 and the cooling water. In addition, as such a refrigerant, a chlorofluorocarbon or the like can be used.

The compressed refrigerant gas X1 is cooled and liquefied by heat exchange between itself and the cooling water, thereby becoming a refrigerant liquid X2, and the refrigerant liquid X2 accumulates in a bottom portion of the condenser 2. The bottom portion of the condenser 2 is connected to the economizer 3 through a flow path R2. Further, the expansion valve 6 for decompressing the refrigerant liquid X2 is provided in the flow path R2. The refrigerant liquid X2 decompressed by the expansion valve 6 is supplied to the economizer 3 through the flow path R2.

The economizer 3 temporarily stores the refrigerant liquid X2 discharged from the condenser 2 and then decompressed in the expansion valve 6 and separates the refrigerant into a liquid phase and a gas phase. A top portion of the economizer 3 is connected to an economizer connecting pipe 5b of the turbo compressor 5 through a flow path R3. A gas-phase component X3 of the refrigerant separated out by the economizer 3 is supplied to a second compression stage 12 (described later) through the flow path R3 without passing through the evaporator 4 and a first compression stage 11 (described later), and thus the efficiency of the turbo compressor 5 is increased. On the other hand, a bottom portion of the economizer 3 is connected to the evaporator 4 through a flow path R4. The expansion valve 7 for further decompressing the refrigerant liquid X2 is provided in the flow path R4. The refrigerant liquid X2 further decompressed by the expansion valve 7 is supplied to the evaporator 4 through the flow path R4.

The evaporator 4 evaporates the refrigerant liquid X2 and cools cold water by the heat of vaporization.

The evaporator 4 is provided with a heat exchanger tube 4a through which the cold water flows, and causes the cooling of the cold water and the evaporation of the refrigerant liquid X2 by heat exchange between the refrigerant liquid X2 and the cold water. The refrigerant liquid X2 evaporates by taking in heat by heat exchange between itself and the cold water, thereby becoming a refrigerant gas X4. A top portion of the evaporator 4 is connected to a gas suction pipe 5c of the turbo compressor 5 through a flow path R5. The refrigerant gas X4 having evaporated in the evaporator 4 is supplied to the turbo compressor 5 through the flow path R5.

The turbo compressor 5 compresses the refrigerant gas X4 having evaporated and supplies it to the condenser 2 as the compressed refrigerant gas X1. The turbo compressor 5 is a two-stage compressor which is provided with the first compression stage 11 which compresses the refrigerant gas X4, and the second compression stage 12 which further compresses the refrigerant compressed in one step.

An impeller 13 is provided in the first compression stage 11, an impeller 14 is provided in the second compression stage 12, and these impellers are connected by a rotating shaft 15. The turbo compressor 5 has a motor 10 and compresses the refrigerant by rotating the impeller 13 and the impeller 14 by the motor 10. Each of the impeller 13 and the impeller 14 is a radial impeller and radially leads out the refrigerant suctioned in an axial direction.

An inlet guide vane 16 for regulating the intake amount of the first compression stage 11 is provided in the gas suction pipe 5c. The inlet guide vane 16 is made to be rotatable such that an apparent area from a flow direction of the refrigerant gas X4 can be changed. A diffuser flow path is provided around each of the impeller 13 and the impeller 14, and the refrigerant led out in a radial direction is compressed and increased in pressure in the diffuser flow path. Further, it is possible to supply the refrigerant to the next compression stage by a scroll flow path provided around the diffuser flow path. An outlet throttle valve 17 is provided around the impeller 14 and can control the discharge amount from the gas discharge pipe 5a.

Further, the turbo compressor 5 is provided with a hermetic type housing 20. The inside of the housing 20 is partitioned into a compression flow path space S1, a first bearing accommodation space S2, a motor accommodation space S3, a gear unit accommodation space S4, and a second bearing accommodation space S5.

The impeller 13 and the impeller 14 are provided in the compression flow path space S1. The rotating shaft 15 connecting the impeller 13 and the impeller 14 is provided to pass through the compression flow path space S1, the first bearing accommodation space S2, and the gear unit accommodation space S4. A bearing 21 supporting the rotating shaft 15 is provided in the first bearing accommodation space S2.

A stator 22, a rotor 23, and a rotating shaft 24 connected to the rotor 23 are provided in the motor accommodation space S3. The rotating shaft 24 is provided to pass through the motor accommodation space S3, the gear unit accommodation space S4, and the second bearing accommodation space S5. A bearing 31 supporting the anti-load side of the rotating shaft 24 is provided in the second bearing accommodation space S5. A gear unit 25, a bearing 26, a bearing 27, and an oil tank 28 are provided in the gear unit accommodation space S4.

The gear unit 25 has a large-diameter gear 29 which is fixed to the rotating shaft 24, and a small-diameter gear 30 which is fixed to the rotating shaft 15 and engaged with the large-diameter gear 29. The gear unit 25 transmits a rotating force such that the rotational frequency of the rotating shaft 15 increases with respect to the rotational frequency of the rotating shaft 24 (the rotational speed of the rotating shaft 15 increases). The bearing 26 supports the rotating shaft 24. The bearing 27 supports the rotating shaft 15. The oil tank 28 stores lubricating oil which is supplied to the respective sliding sites such as the bearing 21, the bearing 26, the bearing 27, and the bearing 31.

A sealing mechanism 32 and a sealing mechanism 33 which seal the periphery of the rotating shaft 15 are provided in the housing 20 between the compression flow path space S1 and the first bearing accommodation space S2. Further, a sealing mechanism 34 which seals the periphery of the rotating shaft 15 is provided in the housing 20 between the compression flow path space S1 and the gear unit accommodation space S4. Further, a sealing mechanism 35 which seals the periphery of the rotating shaft 24 is provided in the housing 20 between the gear unit accommodation space S4 and the motor accommodation space S3. Further, a sealing mechanism 36 which seals the periphery of the rotating shaft 24 is provided in the housing 20 between the motor accommodation space S3 and the second bearing accommodation space S5.

The motor accommodation space S3 is connected to the condenser 2 through a flow path R6. The refrigerant liquid X2 is supplied from the condenser 2 to the motor accommodation space S3 through the flow path R6. The refrigerant liquid X2 supplied to the motor accommodation space S3 flows around the stator 22 and cools the motor accommodation space S3 by heat exchange between the stator 22 and the surroundings thereof. The motor accommodation space S3 is connected to the evaporator 4 through the flow path R7. The refrigerant liquid X2 having taken in heat in the motor accommodation space S3 is supplied to the evaporator 4 through the flow path R7.

The oil tank 28 has an oil feed pump 37. The oil feed pump 37 is connected to the second bearing accommodation space S5 through, for example, a flow path R8. The lubricating oil is supplied from the oil tank 28 to the second bearing accommodation space S5 through the flow path R8. The lubricating oil supplied to the second bearing accommodation space S5 is supplied to the bearing 31 and secures the lubricity of a sliding site of the rotating shaft 24 and simultaneously reduces generation of heat at the sliding site (cooling). The second bearing accommodation space S5 is connected to the oil tank 28 through a flow path R9. The lubricating oil supplied to the second bearing accommodation space S5 returns to the oil tank 28 through the flow path R9.

In the turbo refrigerator 1 of this embodiment having such a configuration, the compressed refrigerant gas X1 is cooled and condensed by the cooling water in the condenser 2, and the cooling water is heated, whereby heat is exhausted. The refrigerant liquid X2 produced by the condensation in the condenser 2 is decompressed by the expansion valve 6 and then supplied to the economizer 3, and after the gas-phase component X3 of the refrigerant is separated out, the refrigerant liquid X2 is further decompressed by the expansion valve 7 and then supplied to the evaporator 4. The gas-phase component X3 of the refrigerant is supplied to the turbo compressor 5 through the flow path R3.

The refrigerant liquid X2 supplied to the evaporator 4 evaporates in the evaporator 4, thereby taking the heat of the cold water and thus cooling the cold water. In this way, the heat of the cold water before cooling is substantially transported to the cooling water supplied to the condenser 2. The refrigerant gas X4 produced due to the evaporation of the refrigerant liquid X2 is supplied to the turbo compressor 5, thereby being compressed, and is then supplied to the condenser 2 again.

Further, a portion of the refrigerant liquid X2 accumulated in the condenser 2 is supplied to the motor accommodation space S3 through the flow path R6. The refrigerant liquid X2 supplied to the motor accommodation space S3 through the flow path R6 cools the motor 10 accommodated in the motor accommodation space S3 and is then returned to the evaporator 4 through the flow path R7.

Further, the lubricating oil flowing through the flow path R8 is supplied to the first bearing accommodation space S2, the second bearing accommodation space S5, and the gear unit accommodation space S4, thereby reducing the sliding resistance of the bearing 21, the gear unit 25, or the like.

Next, the flow path R3 and the economizer connecting pipe 5b will be described in detail with reference to FIG. 2. The flow path R3 and the economizer connecting pipe 5b cause the gas-phase component X3 of the refrigerant separated out in the economizer 3 to join the flow (the main stream) of the compressed refrigerant gas X1 in the turbo compressor 5. The flow path R3 and the economizer connecting pipe 5b function as a return flow portion which returns the gas-phase component X3 of the refrigerant separated out in the economizer 3 to the turbo compressor 5.

The flow path R3 is a pipe having a uniform diameter, and the diameter is set such that a pressure loss in the entirety of the flow path R3 and the economizer connecting pipe 5b is a value at which almost the total amount of the gas-phase component X3 of the refrigerant obtained by gas-liquid separation in the economizer 3 can flow from the economizer 3 into the flow path R3.

Figure 2:
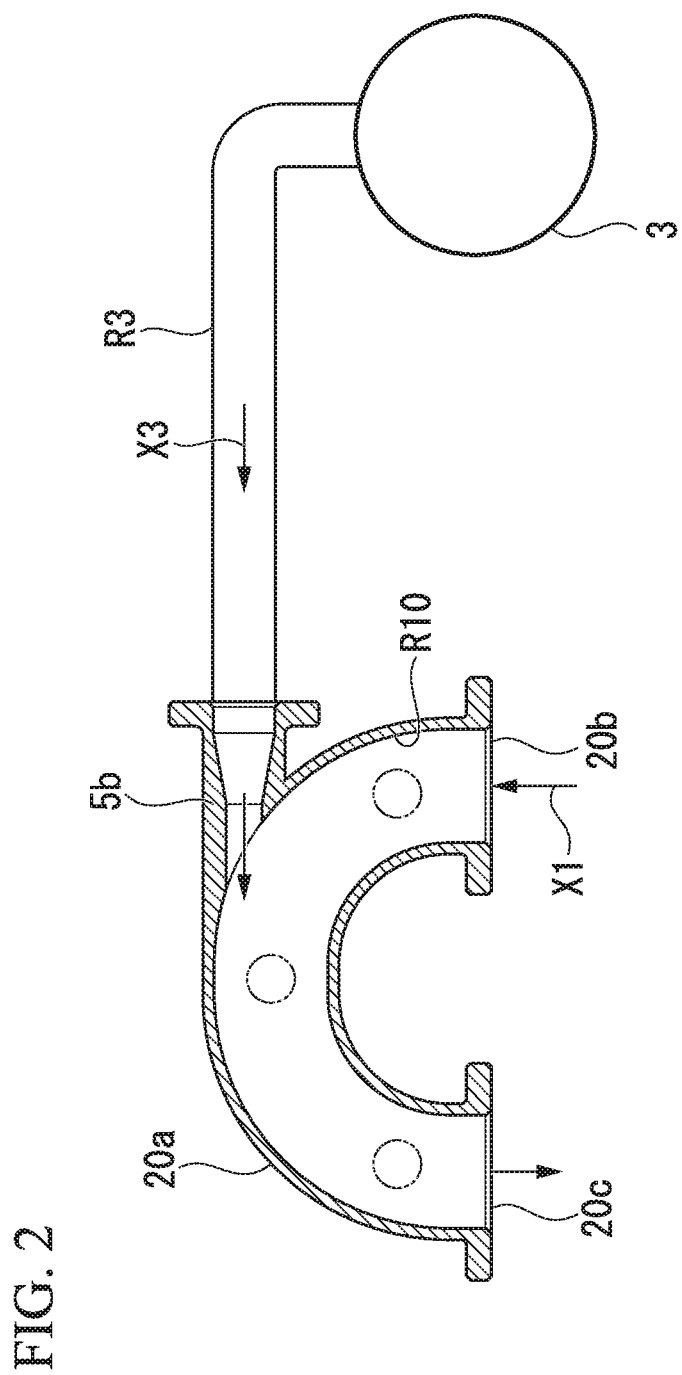
FIG. 2 is an enlarged schematic diagram which includes a flow path and an economizer connecting pipe which are provided in the turbo refrigerator in the embodiment of the present invention.

As shown in FIG. 2, in the turbo refrigerator 1 of this embodiment, a return flow location in the turbo compressor 5, to which the gas-phase component X3 of the refrigerant separated out in the economizer 3 is returned, is made to be an elbow pipe 20a. Here, the elbow pipe 20a is set to be a first flow path R10. The elbow pipe 20a is a 180° elbow pipe in which an inlet 20b and an outlet 20c are directed in the opposite direction. The economizer connecting pipe 5b is connected to the elbow pipe 20a from a tangential direction. The economizer connecting pipe 5b has a throttle flow path which is directly connected to the elbow pipe 20a and reduces in diameter toward the elbow pipe 20a from the flow path R3 side. The economizer connecting pipe 5b increase the flow velocity of the gas-phase component X3 of the refrigerant flowing in from the flow path R3 and supplies the gas-phase component X3 of the refrigerant to the elbow pipe 20a from the tangential direction so as to go along the compressed refrigerant gas X1 which flows through the elbow pipe 20a. Accordingly, the gas-phase component X3 of the refrigerant which flows through the flow path R3 flows in parallel to the compressed refrigerant gas X1 which flows through the elbow pipe 20a when joining the compressed refrigerant gas X1.

The turbo refrigerator 1 of this embodiment having such a configuration is provided with the economizer connecting pipe 5b having a throttle flow path.

That is, in the turbo refrigerator 1 of this embodiment which includes the turbo compressor 5 to which the gas-phase component X3 of the refrigerant from the economizer 3 is supplied, the turbo compressor 5 includes the elbow pipe 20a through which the compressed refrigerant gas X1 flows, and the economizer connecting pipe 5b connected to the elbow pipe 20a and the flow path R3 through which the gas-phase component X3 of the refrigerant flows, and the diameter of the economizer connecting pipe 5b reduces toward the elbow pipe 20a from the flow path R3.

In other words, in the turbo refrigerator 1 of this embodiment which includes the turbo compressor 5 to which the gas-phase component X3 of the refrigerant from the economizer 3 is supplied, the turbo compressor 5 includes the elbow pipe 20a through which the compressed refrigerant gas X1 flows, and the economizer connecting pipe 5b connected to the elbow pipe 20a and the flow path R3 through which the gas-phase component X3 of the refrigerant flows, and the diameter of the economizer connecting pipe 5b on the elbow pipe 20a side is smaller than the diameter of the economizer connecting pipe 5b on the flow path R3 side.

For this reason, it is possible to widen the flow path area of the flow path R3 on the economizer 3 side which is equivalent to an entrance portion, and increase the velocity of the gas-phase component X3 of the refrigerant which is discharged toward the inside of the elbow pipe 20a. Therefore, according to the turbo refrigerator 1 of this embodiment, it is possible to favorably perform gas-liquid separation in the economizer 3 by suppressing an increase in pressure loss in the combined entirety of the economizer connection pipe 5b and the flow path R3 and to reduce an acceleration loss when joining the main stream in the elbow pipe 20a.

Further, according to the turbo refrigerator 1 of this embodiment, the gas-phase component X3 of the refrigerant which is supplied from the economizer connecting pipe 5b to the elbow pipe 20a is supplied along the flow of the compressed refrigerant gas X1 which flows through the elbow pipe 20a. For this reason, it is possible to suppress generation of turbulent flow when the gas-phase component X3 of the refrigerant is mixed with the compressed refrigerant gas X1, and thus suppress an increase in a loss in the elbow pipe 20a.

Further, in the turbo refrigerator 1 of this embodiment, the return flow location in the turbo compressor 5, to which the gas-phase component X3 of the refrigerant separated out in the economizer 3 is returned, is made to be the elbow pipe 20a, and the gas-phase component X3 of the refrigerant is supplied into the elbow pipe 20a from the tangential direction of the elbow pipe 20a. For this reason, it becomes possible to cause the gas-phase component X3 of the refrigerant to flow in parallel to the flow of the compressed refrigerant gas X1 when joining the compressed refrigerant gas X1 with a simple configuration.

The preferred embodiment of the present invention has been described above with reference to the accompanying drawings. However, the present invention is not limited to the embodiment described above. The shapes, the combination, or the like of the respective constituent members shown in the embodiment described above is one example and various changes can be made based on design requirements or the like within a scope of the present invention.

For example, in the embodiment described above, a configuration in which the location to which the gas-phase component X3 of the refrigerant separated out in the economizer 3 is returned is the elbow pipe 20a has been described. However, the present invention is not limited thereto, and for example, when the turbo compressor is provided with a straight pipe, it is also possible to use the straight pipe as the return flow location of the gas-phase component X3 of the refrigerant. Also in this case, it is desirable that the gas-phase component X3 of the refrigerant which is returned is supplied into the straight pipe so as to go along the main stream in the straight pipe as much as possible.

Further, in the embodiment described above, a configuration in which the gas-phase component X3 of the refrigerant is supplied to the elbow pipe 20a from the tangential direction has been described. However, the present invention is not limited thereto, and the gas-phase component X3 of the refrigerant may be spirally supplied to a pipe through which the main stream flows, such as the elbow pipe 20a.

Further, in the embodiment described above, a configuration in which the economizer connecting pipe 5b is provided at only one location with respect to the elbow pipe 20a has been described. However, the present invention is not limited thereto, and a configuration may be made in which a plurality of economizer connecting pipes 5b are connected to the elbow pipe 20a and the flow path R3 branches so as to be connected to the respective economizer connection pipes 5b.

In other words, the turbo compressor in the turbo refrigerator may further have a third flow path through which the gas-phase component X3 of the refrigerant flows from an economizer connecting pipe 5x different from the economizer connecting pipe 5b, and another connecting pipe which is connected to the elbow pipe 20a and provided separately from the economizer connecting pipe 5b.

In the embodiment described above, the elbow pipe 20a is set to be the first flow path R10. However, the first flow path R10 is not limited to the elbow pipe 20a and a joint or the like which is usually used in the art may be used.

INDUSTRIAL APPLICABILITY

According to the present invention, the return flow portion has a throttle portion. For this reason, it is possible to widen a flow path area at an entrance portion of the return flow portion on the economizer side and increase the velocity of the gas-phase component of the refrigerant which is discharged from the return flow portion. Therefore, according to the present invention, it is possible to favorably perform gas-liquid separation in the economizer by suppressing an increase in pressure loss in the return flow portion and to reduce an acceleration loss when joining the main stream in the turbo compressor.

REFERENCE SIGNS LIST

1: turbo refrigerator
2: condenser
2a, 4a: heat exchanger tube
3: economizer
4: evaporator
5: turbo compressor
5a: gas discharge pipe
5b: economizer connecting pipe (return flow portion)
5c: gas suction pipe
6, 7: expansion valve
10: motor
11: first compression stage
12: second compression stage
13, 14: impeller
15, 24: rotating shaft
16: inlet guide vane
17: outlet throttle valve
20: housing
20a: elbow pipe
20b: inlet
20c: outlet
21, 26, 27, 31: bearing
22: stator 23: rotor
25: gear unit
28: oil tank
29: large-diameter gear
30: small-diameter gear
32, 33, 34, 35, 36: sealing mechanism
37: oil feed pump
R1, R2, R4, R5, R6, R7, R8, R9: flow path
R3: flow path (return flow portion)
S1: compression flow path space
S2: first bearing accommodation space
S3: motor accommodation space
S4: gear unit accommodation space
S5: second bearing accommodation space
X1: compressed refrigerant gas
X2: refrigerant liquid
X3: gas-phase component of refrigerant
X4: refrigerant gas

The invention claimed is:

1. A turbo refrigerator comprising:
a condenser;
a first expansion valve which decompresses a refrigerant from the condenser;
an economizer to which the refrigerant decompressed by the first expansion valve is supplied;
a second expansion valve which decompresses the refrigerant from the economizer;
an evaporator to which the refrigerant decompressed by the second expansion valve is supplied and which evaporates the refrigerant into a refrigerant gas;
a turbo compressor to which a gas-phase component of a refrigerant from the economizer and the refrigerant gas from the evaporator is supplied; and
a second flow path through which the gas-phase component of the refrigerant flows,
wherein the turbo compressor includes
a first compression stage which compresses the refrigerant gas,
a second compression stage which compresses the compressed refrigerant gas by the first compression stage,
a first flow path through which the compressed refrigerant gas flows between the first compression stage and the second compression stage, and
a connecting pipe connected to the first flow path and the second flow path,
wherein a diameter of the connecting pipe reduces toward the first flow path from the second flow path.

2. The turbo refrigerator according to claim 1, wherein a pipe configuring the second flow path has a uniform diameter.

3. The turbo refrigerator according to claim 1, wherein the gas-phase component of the refrigerant which flows through the second flow path flows in parallel to the compressed refrigerant gas which flows through the first flow path when joining the compressed refrigerant gas.

4. The turbo refrigerator according to claim 1, wherein the first flow path is configured with an elbow pipe.

5. The turbo refrigerator according to claim 4, wherein an angle of an outlet with respect to an inlet of the elbow pipe is 180°.

6. The turbo refrigerator according to claim 4, wherein the gas-phase component of the refrigerant which flows through the second flow path is spirally supplied to the elbow pipe.

7. A turbo refrigerator comprising:
a condenser;
a first expansion valve which decompresses a refrigerant from the condenser;
an economizer to which the refrigerant decompressed by the first expansion valve is supplied;
a second expansion valve which decompresses the refrigerant from the economizer;
an evaporator to which the refrigerant decompressed by the second expansion valve is supplied and which evaporates the refrigerant into a refrigerant gas;
a turbo compressor to which a gas-phase component of a refrigerant from the economizer and the refrigerant gas from the evaporator is supplied; and
a second flow path through which the gas-phase component of the refrigerant flow,
wherein the turbo compressor includes
a first compression stage which comprises the refrigerant gas,
a second compression stage which compresses the compressed refrigerant gas by the first compression stage,
a connecting pipe connected to a first flow path through which the compressed refrigerant gas flows and a second flow path through which the gas-phase component of the refrigerant flows, and
wherein a diameter of the connecting pipe on the first flow path side is smaller than a diameter of the connecting pipe on the second flow path side.

* * * * *